(12) United States Patent
Aizenbud-Reshef et al.

(10) Patent No.: US 7,137,103 B2
(45) Date of Patent: Nov. 14, 2006

(54) COVERAGE ANALYSIS OF MESSAGE FLOWS

(75) Inventors: Neta Aizenbud-Reshef, Haifa (IL); Gabi Zodik, Nesher (IL)

(73) Assignee: International Business Machines Corporation, Armonk, NY (US)

( * ) Notice: Subject to any disclaimer, the term of this patent is extended or adjusted under 35 U.S.C. 154(b) by 923 days.

(21) Appl. No.: 10/091,416

(22) Filed: Mar. 7, 2002

(65) Prior Publication Data

US 2002/0178281 A1 Nov. 28, 2002

Related U.S. Application Data

(60) Provisional application No. 60/274,320, filed on Mar. 8, 2001.

(51) Int. Cl.
*G06F 9/44* (2006.01)
(52) U.S. Cl. .................... 717/124; 717/125; 717/130
(58) Field of Classification Search ........ 717/124–127, 717/105, 107, 132, 126–128; 709/202, 204, 709/218, 236, 225–228; 719/310–312, 315–331; 706/10
See application file for complete search history.

(56) References Cited

U.S. PATENT DOCUMENTS

| | | | | |
|---|---|---|---|---|
| 4,617,663 A | * | 10/1986 | Lake et al. | 714/736 |
| 5,499,364 A | * | 3/1996 | Klein et al. | 709/202 |
| 5,544,310 A | * | 8/1996 | Forman et al. | 714/31 |
| 5,778,189 A | * | 7/1998 | Kimura et al. | 709/236 |
| 5,790,789 A | * | 8/1998 | Suarez | 709/202 |
| 5,950,000 A | * | 9/1999 | O'Leary et al. | 717/105 |
| 5,978,940 A | * | 11/1999 | Newman et al. | 714/712 |
| 6,014,723 A | * | 1/2000 | Tremblay et al. | 711/1 |
| 6,058,389 A | * | 5/2000 | Chandra et al. | 707/1 |
| 6,516,306 B1 | * | 2/2003 | Alur et al. | 706/10 |
| 6,738,975 B1 | * | 5/2004 | Yee et al. | 719/310 |
| 6,848,111 B1 | * | 1/2005 | Schwabe et al. | 719/331 |

OTHER PUBLICATIONS

Aizenbud-Reshef, "Coverage Analysis for Message Flows", presented at UISSRE 2001, the 12th International Symposium on Software Reliability Engineering in Hong Kong, 27-30 (Nov. 2001).
Chen, et al, "An Empirical Study of the Correlation Between Code Coverage and Reliability Estimation", Proceedings of the 3rd IEEE International Software Metrics Symposium, 133-141 (Mar. 1996).
Frankl, et al, "An Applicable Family of Data Flow Testing Criteria", *IEEE Transactions on Software Engineering*, 14(10, (Oct. 1988).
Franz, Michael, "Toward and Execution Model for Component Software", *Special Issues in Object Oriented Programming: Workshop Reader of the 10th European Conference in Object-Oriented Programming ECOOP*, 14-149 (1996).

(Continued)

*Primary Examiner*—Wei Zhen
*Assistant Examiner*—Anna Deng
(74) *Attorney, Agent, or Firm*—Browdy and Neimark, PLLC

(57) ABSTRACT

A method for assessing adequacy of message flow testing, including defining coverage criteria for testing a message flow through a set of message flow elements, determining a message-flow-coverage-goal for the message flow with respect to the coverage criteria, and designing a test suite responsive to the message-flow-coverage-goal. The method further includes applying the test suite to the message flow to generate a coverage result for the set of message flow elements and comparing the coverage result with the message-flow-coverage-goal.

37 Claims, 8 Drawing Sheets

OTHER PUBLICATIONS

Hutchins, et al, "Experiments on the Effectiveness of Dataflow—and Controlflow-Based Test Adequacy Criteria", Presented at ICSE-16, 16th International Conference on Software Engineering, Sorrento, Italy (May 16-21, 1994).

Keren, et al, "Test Adequacy Criteria for Component—Based Visual Software", *Sixteenth International Conference on Test Computer Software(TCS 99)*, (Jun. 1999).

Kim, et al, "Investigating the Applicability of Traditional Test Adequacy Criteria for Object-Oriented Programs", presented at FESMA-AEMES 2000: The European Software Measurement Conference, Madrid, Oct. 2000.

Rothermel, et al, "Testing Strategies for Form-Based Visual Programs", *Proceedings of the Eighth International Symposium on Software Reliability Engineering*, 96-107, (Nov. 1997).

Spinellis, et al, "Language and Architecture Paradigms as Object Classes: A Unified Approach Towards Multiparadigm Programming", *Programming Languages and System Architectures International Conference*, Springer-Verlag, 191-207 (1994).

Vondrak, "Message-Oriented Middleware", *Carnegie-Mellon Software Technology Review*, available at http://www.sei.cmu.edu/str/descriptions.

Zhu, et al, "Software Unit Test Coverage and Adequacy", *ACM Computing Surveys*, 29(4), (Dec. 1997).

MQSeries Integrator Version 2.1, *Introduction and Planning*, IBM Corporation 2000.

MQSeries Integrator Version 2.1, *Using the Control Center*, IBM Corporation 2000.

* cited by examiner

FIG. 6

MULTIPLE CONDITION COVERAGE TABLE FOR NODE CHANGESTATUS ~ 302

| CONDITION | LINE IN CODE | CONTAINED IN STATEMENT | NO. TIMES FALSE | NO. TIMES TRUE |
|---|---|---|---|---|
| InputRoot.XML.e_Human.e_Occupation='CEO' | 8 | IF InputRoot.X... | 8 | 2 |
| InputRoot.XML.e_Human.e_Occupation='CTO' | 8 | IF InputRoot.X... | 5 | 3 |
| InputRoot.XML.e_Human.e_Emp.e_Profession... | 8 | IF InputRoot.X... | 1 | 0 |

300

304

306

308

310

COVERAGE ANALYSIS OF MESSAGE FLOWS

CROSS-REFERENCE TO RELATED APPLICATIONS

This application claims the benefit of U.S. Provisional Patent Application No. 60/274,320, filed Mar. 8, 2001, which is assigned to the assignee of the present invention and which is incorporated herein by reference.

FIELD OF THE INVENTION

The present invention relates generally to testing software, and specifically to testing visual message flows.

BACKGROUND OF THE INVENTION

Many types of software have been identified in the field of software engineering, though no single taxonomy system is yet universally accepted. It is common to refer to types of software according to programming and architectural paradigms known in the art. In an article entitled "Language and Architecture Paradigms as Object Classes: A Unified Approach Towards Multiparadigm Programming" by Spinellis, et al., published in *Programming Languages and System Architectures International Conference*, pages 191–207, by Springer-Verlag in 1994, and which is incorporated herein by reference, the authors define a paradigm as "a category of entities sharing a common characteristic." In the context of software, Spinellis, et al. note that "[c]omputer language paradigms offer linguistic abstractions . . . for expressing program implementations. Similarly, system architectures offer the hardware abstractions and quantitative theories applicable to the execution of compiled programs." The authors go on to describe a number of properties which may be used to characterize different paradigms, e.g., the property of problem decomposition entity. The problem decomposition entity is the primary architectural entity in a paradigm, i.e., the principal unit used to characterize and implement an application. In the case of an object-oriented system, for example, objects comprise the primary architectural element, and are used to model and implement the software.

Object-oriented, procedural, logical, component-oriented, visual, agent-oriented, and concurrent software are only a few examples of architectural and programming paradigms known in the art. Moreover, because many of the paradigms are overlapping and independent, a software application may be described in terms of a plurality of paradigms. For example, a given application may be at once object-oriented, visual, concurrent, and component-based.

In an article titled "Toward an Execution Model for Component Software," by Michael Franz, published in *Special Issues in Object Oriented Programming: Workshop Reader of the 10th European Conference in Object-Oriented Programming ECOOP '96*, pages 144–149, Linz, 1996, and which is incorporated herein by reference, the author states that "[w]hen discussing different programming paradigms, we usually base our taxonomy on the underlying design methodology, or, less subtly, on the programming language being used in a design. Strangely enough, this is no longer true when it comes to component-oriented programming." Franz further suggests that the programming model, distribution model, and execution model are useful properties in the classification of types of software including component-oriented software.

Software designers typically select one or more programming and architectural paradigms in the design and implementation of an application. Many criteria exist in the art for selecting a paradigm, including compatibility with an existing system, cost of development and testing, cost of long-term maintenance, and similarity of the paradigm to the underlying application problem. As Spinellis, et al. observe "[i]t is widely accepted that each paradigm offers a different set of tradeoffs between efficiency, provability, elision, and implementation cost."

A software paradigm identified in the art is message-oriented software. Message-oriented software treats messages as the primary architectural element, or the problem decomposition entity, according to Spinellis, et al. Applications are defined in terms of message flows, i.e., incoming and outgoing messages, and the processing performed on the messages. While the message-oriented paradigm is applicable to a wide range of business problems, the paradigm is especially compatible with a class of software applications known in the art as message-oriented middleware (MOM).

In an article titled "Message-Oriented Middleware" by Vondrak, published in the *Carnegie-Mellon Software Technology Review* which can be found at http://www.sei.cmu.edu/str/descriptions, and which is incorporated herein by reference, MOM is defined as "a client/server infrastructure that increases the interoperability, portability, and flexibility of an application by allowing the application to be distributed over multiple heterogeneous platforms. It reduces the complexity of developing applications that span multiple operating systems and network protocols by insulating the application developer from the details of the various operating system and net interfaces. Application Programming Interfaces (APIs) that extend across diverse platforms and networks are typically provided by the MOM." In other words, MOM is software that focuses on the interface between applications in a distributed environment, possibly on a variety of platforms. MOM implements inter-application communication as a separate function, independent of the communicating applications. Thus, in a world of diverse systems, developed in different languages, using different paradigms, and running on different hardware, MOM facilitates interaction among the diverse systems. This capability is especially significant for organizations with a varied collection of legacy systems; further, it provides a way to integrate new systems, e.g., a system acquired as a result of a merger or acquisition, without substantial investment. A plurality of implementations of MOM exist in the art, for example, the MQSeries produced by IBM Corporation of Armonk, N.Y., and Tuxedo by BEA Systems, Inc. of San Jose, Calif.

FIG. 1 is a schematic block diagram depicting an architecture of a system 10 employing message-oriented middleware, as is known in the art. System 10 comprises client and/or server hardware platforms 12, 18, and 24, chosen from hardware platforms known in the art, and also designated respectively herein as client platform A, client platform B, and server platform C. Client platform A runs an application 14, also designated herein as client program A, and client platform B runs an application 20, designated herein as client program B. An application 26, also designated herein as server program C, runs on server platform C.

Client programs typically implement system functions visible to a user of the system, e.g., displaying results of a query or recording a new transaction. Server programs comprise programs providing services to client programs. Server programs supply a range of services, including access to a centralized resource such as a database, calculations, and communications services.

Client program A, client program B, and server program C are implemented using one or more of a plurality of programming and architectural paradigms known in the art. Client program A, client program B, and client program C may each utilize different architectural and programming paradigms. Typically, client program A, client program B, and server program C interact with each other by sending and receiving messages via a network 30. Client programs A, B, and C, and their respective platforms, are assumed to comprise different software paradigms and hardwares.

Because of the diversity of hardware platforms and software paradigms included in system 10, messages created by client program A must undergo transformations in order to render them understandable to network 30, and to client program B and server program C. Similar transformations are required for messages to and from client program B and server program C. A message-oriented middleware 16 provides the transformation service. MOM 16 comprises a platform interface which converts messages created by client program A from client platform A format into a protocol suitable for network 30, and transforms messages received by client program A from network 30 format into client platform A format. MOM 16 performs substantially similar transformations for client program B and server program C. Typically, the platform interface interprets message header and trailer data, removes or adds headers and trailers, and breaks up or reassembles messages.

In addition to the platform interface, MOM 16 comprises application-level logic for message processing. Thus, MOM 16 transforms a message sent by client program A, and produces a message that is valid in the context of communication via network 30; however, the message format and content may not match the expectations of one or more intended recipients of the message. Moreover, client program A is not necessarily aware of all the programs wishing to receive its message. For these cases, MOM 16 encapsulates the application logic required to re-format and route the message.

IBM's MQSeries Integrator comprises an example of an implementation of MOM 16. As described in Chapter 1 of *MQSeries Integrator Introduction and Planning*, published by IBM Corporation, 2000, and incorporated herein by reference, the services provided include the ability to "route a message to several destinations, using rules that act on the contents of one or more of the fields in the message or message header, transform a message, so that applications using different formats can exchange messages in their own formats . . . modify the contents of a message (for example, by adding data extracted from a database . . . )" Further, Chapter 1 cites the two principal benefits of MOM: message and data transformations are performed in a single place, thereby facilitating upgrades and modifications; and additional systems can be integrated quickly, by focusing on interface requirements.

Development of message-oriented software comprises defining message flows. Message flows describe the transformations, processing, and routing that are associated with a message. In an article titled "Coverage Analysis for Message Flows," by Aizenbud-Reshef, to be presented at ISSRE 2001, the 12$^{th}$ International Symposium on Software Reliability Engineering in Hong Kong, Nov. 27–30, 2001, which is incorporated herein by reference, the author states that a message flow is a visual program describing the processing logic as a directed graph, which represents that processing performed on a message. Development environments for message-oriented software typically provide graphical tools for the definition and debugging of message flows, since visual programming is considered the most natural paradigm for message-oriented software. The Free On-Line Dictionary of Computing (FOLDOC), which can be found at http://foldoc.doc.ic.ac.uk/foldoc and which is incorporated herein by reference, defines a visual programming environment as "[s]oftware which allows the use of visual expressions (such as graphics, drawings, animation or icons) in the process of programming. These visual expressions may be used as graphical interfaces for textual programming languages. They may be used to form the syntax of new visual programming languages leading to new paradigms such as programming by demonstration or they may be used in graphical presentations of the behaviour or structure of a program."

FIG. 2 is a schematic message flow directed graph illustrating a message flow 50, as is known in the art. Message flow 50 comprises messages, connections, and nodes. An incoming message 52 enters message flow 50 via an input node 56. An outgoing message 66 exits message flow 50 via an output node 60. Incoming message 52 passes through a number of nodes: input node 56, a processing node 58, and output node 60. Input node 56 and ouput node 60 handle the queuing functions required to receive or dispatch a message, and typically comprise implementations of message queues Processing node 58 applies logic and functions to the message. All nodes comprise zero or more terminals, through which messages enter and exit the node. For example, processing node 58 comprises four terminal: an input terminal 57, and three output terminals designated 59, 61, and 63.

Typically, a message flow developer works in a visual development environment and constructs message flows by selecting nodes from a store of pre-defined nodes, extending existing nodes to create new nodes, or creating completely new nodes. Message flow developers implement logic in nodes by writing code in a language such as Structured Query Language (SQL). A node may itself contain a message flow, termed a sub-flow, in which case the node is considered a compound node. In message flow 50, processing node 58 can identify a run-time exception, which directs the message flow to a special type of output terminal, a failure terminal 63 and an exception handler 62.

Message flows can range from the very simple, performing just one action on a message, to the complex, providing a number of actions on the message to transform its format and content. A message flow can process one message in several ways to deliver a number of output messages, perhaps with different format and content, to a number of target applications.

Developers test all types of software for the same reason: to provide an assurance that the software performs as specified, without defects. Testing, according to the Free On-Line Dictionary of Computing, is defined as "[t]he process of exercising a product to identify differences between expected and actual behaviour." Since testing is costly and time-consuming, criteria are needed to assess the sufficiency of a set of tests. In an article titled "Test Adequacy Criteria for Component-Based Visual Software" by Keren and Shaham-Gafni, published in the *Sixteenth International Conference on Testing Computer Software* (TCS 99) in June, 1999, which is incorporated herein by reference, the authors note that "[t]he main technique for demonstrating that testing has been thorough is called test coverage analysis. Simply stated, the idea of test coverage analysis is to create, in some systematic fashion, a large and comprehensive list of tasks corresponding to the program under test. The tester's goal is to create a test suite that covers this list of tasks."

FIG. 3 is a flowchart of elements and processes involved in a process 80 for testing software under test (SUT) 51, as is known in the art. Initially, in a determine coverage model step 82, a coverage model is chosen. A number of coverage models are known in the art, referring to different ways of assessing adequacy of testing. For example, statement coverage considers a percentage of program statements executed over a test suite, functional coverage involves measuring a percentage of specified functions that a test suite exercised, and path coverage concerns how many different control-flow paths the tests caused SUT 51 to execute. In an establish coverage goals step 84, goals are identified according to the coverage model chosen in step 82, the goals both directing the creation of a test suite and forming stopping criteria for overall testing process 80. Coverage goals comprise metrics referring to the extent to which SUT 51 is exercised, for example, a first metric has a goal of 95% statement coverage; a second metric has a goal of 100% functional coverage. In a define coverage tasks step 86, a set of coverage tasks is generated to meet the coverage goals identified in step 84. The coverage tasks comprise a translation of the coverage goals into practical terms relative to SUT 51. For example, a coverage goal of 95% statement coverage engenders a plurality of coverage tasks of the form "execute statement #n," where n is a number comprising all statement numbers in SUT 51.

In a build test suite step 88, a test suite is generated, comprising a plurality of test conditions 90 and a way of evaluating expected results 92. Test conditions 90 comprise input values and conditions intended to exercise SUT 51 and perform one or more coverage tasks 86. Ideally, test conditions 90 should perform all coverage tasks generated in step 86, although in practice it may be difficult to identify a complete set of test conditions a priori. An oracle function typically evaluates expected results, either via manual inspection by a human expert or via automatic comparison to predetermined expected results 92. In an execution step 94, a test harness loads a test condition from test conditions 90 and executes SUT 51. Ideally, the test harness provides a way to execute SUT 51 while controlling inputs and monitoring outputs. During execution, a measure coverage step 96 runs, to assess the coverage achieved during the test. Execution of SUT 51 produces actual results, responsive to the test conditions loaded from test conditions 90. The oracle function performs a comparison step 98 between actual results of execution 94 and expected results 92, and a condition 100 determines the success or failure of the test. An outcome of failure generally indicates a defect in SUT 51, which requires developer attention in a debug step 102. A condition 104 checks whether sufficient testing of SUT 51 has completed, i.e., if the results of measuring coverage in step 96 accord with the coverage goals established in step 84. If the coverage goals have been accomplished, testing process 80 terminates.

If the coverage goals have not yet been achieved, testing process 80 continues in a condition 106 which checks if unexecuted tests remain in test suite 88. If tests remain, a next test condition is selected from test conditions 90, and execution step 94 again executes SUT 51 under the next test condition. If all tests in test suite 88 have executed without achieving the coverage goals of step 84, it is necessary to augment test suite 88 with additional tests in an add tests to test suite step 108, and continue in execution step 94.

Test adequacy criteria for different types of software have been proposed. For example, in Keren et el. propose coverage criteria for component-based visual software, based on utilization of a family of graph representations including the component containment graph, component call graph, component control flow graph, and framed graph. In an article titled "Testing Strategies for Form-Based Visual Programs" by Rothermel, et al., published in the *Proceedings of the Eighth International Symposium on Software Reliability Engineering*, pages 96–107, November 1997, and which is incorporated herein by reference, the authors suggest some test adequacy criteria for testing form-based programs, e.g., spreadsheet applications. The criteria make use of a cell relation graph, and include node and edge, cell dependence, and dataflow adequacy criteria.

Adequacy criteria are known in the art for testing object-oriented software. For example, in an article titled "Investigating the Applicability of Traditional Test Adequacy Criteria for Object-oriented Programs" by Kim et al., presented at FESMA-AEMES 2000: The European Software Measurement Conference, Madrid, October 2000, which is incorporated herein by reference, the authors explore the applicability of non-object-oriented adequacy criteria such as control-flow coverage and data flow-coverage to object-oriented software. Kim et al. conclude that "[t]he experimental result shows that the test criteria are able to deal with most of the OO [object-oriented] features, i.e., many of the defects related to the features could be revealed by the adequate test sets. However, they do not appear to be sufficient. There are a few OO-specific features that the investigated criteria are ineffective at handling, which indicates that the effectiveness of the criteria may be weakened in the presence of those OO features." In sum, it is accepted in the art that test adequacy criteria, i.e., coverage criteria, must suit the software and architectural paradigms used in the application.

SUMMARY OF THE INVENTION

In preferred embodiments of the present invention, a method for evaluating test adequacy for visual message flows is defined. The method comprises analyzing a level of coverage of message flow elements achieved by a test suite. The method provides a way to determine to what extent a message flow is tested, thereby facilitating formulation of coverage goals criteria for stopping the testing process, and directing creation of additional tests In addition, the method indicates untested or partially tested elements in the message flow.

In the context of the present patent application and the claims, message flows are defined as comprising the following visual and textual elements: processing nodes, connections, external resources, and messages. Processing nodes, in turn, comprise the following additional message flow elements: terminals, statements, conditions, and exceptions. Message flow elements are defined and assembled by a message flow developer to create new message flows, typically in a visual environment. Adequacy of a test suite is assessed according to one or more measured test coverage criteria corresponding to the message flow elements. Preferably, a level of coverage is reported in a textual and graphical way, e.g., using color, shading, or shape, to differentiate completely and partially covered elements from elements not covered by a test suite. In preferred embodiments of the present invention, an evaluation of test adequacy is reported on hard-copy and electronic media.

Unlike other methods known in the art for evaluating test adequacy for message flows, in preferred embodiments of the present invention:

A system of coverage criteria specific to visual message flows is formalized, providing a framework for determining coverage goals and tasks, criteria for stopping testing, and guidelines for the creation of additional tests;

Coverage information is presented graphically to the message flow developer, using familiar concepts and views from the context of message flow development; and A metric of the thoroughness of message flow testing is created, allowing objective assessment of the reliability of the message flow software.

In preferred embodiments of the present invention, a method for evaluating test adequacy for visual message flows comprises the following coverage criteria:

Processing node coverage—determines whether each processing node was executed;

Processing node terminal coverage—evaluates whether each terminal of a processing node was traversed;

Connection coverage—measures whether each connection in the message flow was passed through;

Path coverage—determines whether each path of all possible paths through a message flow has been traversed;

N-node coverage—evaluates whether a set of n nodes, selected by the user, was visited in at least a single execution of the message flow;

Statement coverage—evaluates a number of statements executed in processing nodes containing statements;

Multiple condition coverage—reports the true or false outcomes of each boolean sub-expression in processing nodes having boolean sub-expressions;

Exception coverage—reports whether run-time exceptions occurred in those processing nodes having run-time exceptions;

External resources coverage—evaluates whether each access possibility to an external resource, such as a database, was exercised; and Message content coverage—reports whether a message field contained every value from the range of possible values for the field.

There is therefore provided, according to a preferred embodiment of the present invention, a method for assessing adequacy of message flow testing, including defining coverage criteria for testing a message flow through a set of message flow elements, determining a message-flow-coverage-goal for the message flow with respect to the coverage criteria, and designing a test suite responsive to the message-flow-coverage-goal. The method further includes applying the test suite to the message flow to generate a coverage result for the set of message flow elements and comparing the coverage result with the message-flow-coverage-goal.

Preferably, the message flow includes a message-oriented software program wherein a message is a primary architectural element.

Preferably, the message flow is included in a message-oriented middleware application.

Preferably, the message flow includes a visual program describing processing logic as a directed graph, and the message flow includes an independent function, outside of a message sender or message receiver.

Preferably, the message flow includes a program processing a message produced by an application chosen from one of a group of applications including a client application and a server application.

Further preferably, the application includes a message-sending-application and a message-receiving-application executing on different hardware platforms.

Further preferably, the message-sending-application and the message-receiving-application are implemented using different software and architectural paradigms.

Preferably, the message flow elements include at least one element chosen from messages, nodes, connections, terminals, statements, conditions, external resources, and exceptions.

Preferably, defining the coverage criteria includes selecting a coverage model from at least one of processing node coverage, terminal coverage, connection coverage, path coverage, N-node coverage, statement coverage, multiple condition coverage, exception coverage, external resources coverage, and message content coverage.

Preferably, determining the message-flow-coverage-goal includes establishing a required coverage level for at least one of the coverage criteria.

Preferably, applying the test suite to the message flow includes performing an execution of at least a part of the test suite and evaluating an attained coverage level resulting from the execution.

Further preferably, evaluating the attained coverage level includes visiting one or more nodes during the execution of the at least part of the test suite, comparing a number of processing nodes visited to a total number of all processing nodes in the message flow, and computing a processing node coverage metric responsive to the comparison.

Further preferably, visiting the one or more nodes includes entering a simple node.

Further preferably, visiting the one or more nodes includes entering a compound node and visiting zero or more nodes in a constituent sub-flow.

Preferably, evaluating the attained coverage level includes traversing one or more terminals during the execution of the at least part of the test suite, comparing a number of processing node terminals traversed to a total number of processing node terminals in the message flow, and computing a terminal coverage metric responsive to the comparison.

Preferably, evaluating the attained coverage level includes traversing one or more connections during the execution of the at least part of the test suite, comparing a number of connections traversed to a total number of connections in the message flow, and computing a connection coverage metric responsive to the comparison.

Preferably, evaluating the attained coverage level includes selecting a group of one or more sets of N-nodes from the message flow, wherein N includes any whole number less than or equal to a total number of nodes in the message flow, performing at least one execution of the message flow so as to determine a number of nodes visited in each of the one or more sets during the at least one execution, and generating a respective set coverage result for each of the one or more sets, responsive to the number of nodes visited. Further, evaluating the attained coverage level includes determining a number of covered-sets, responsive to the set coverage results, comparing the number of covered-sets to a total number of sets in the group, and computing an N-node coverage metric responsive to the comparison.

Preferably, evaluating the attained coverage level includes performing zero or more runtime exceptions during the execution of the at least part of the test suite, comparing a number of runtime exceptions performed to a total number of all runtime exceptions in the message flow, and computing an exception coverage metric responsive to the comparison.

Preferably, evaluating the attained coverage level includes visiting zero or more failure terminals during the execution of the at least part of the test suite, comparing a number of failure terminals visited to a total number of all failure terminals in the message flow, and computing an exception coverage metric responsive to the comparison.

Preferably, evaluating the attained coverage level includes executing zero or more node statements at least once during the execution of the at least part of the test suite, comparing a number of node statements executed to a total number of node statements in the message flow, and computing a statement coverage metric responsive to the comparison.

Further preferably, computing the statement coverage metric includes comparing a number of node statements executed in a single node to a total number of node statements in the single node.

Further preferably, computing the statement coverage metric includes comparing a number of node statements executed in a compound node's constituent sub-flows to a total number of node statements in the compound node's constituent sub-flows.

Preferably, evaluating the attained coverage level includes assessing an achievement of true and false values for each of zero or more boolean sub-expressions independently during the execution of the at least part of the test suite, comparing the achievement for the one or more boolean sub-expressions to a total number of boolean sub-expression values possible in the message flow, computing a multiple condition coverage metric responsive to the comparison.

Further preferably, computing the multiple condition coverage metric includes comparing a number of achieved true and false values for zero or more boolean sub-expressions in a node to a total number of boolean sub-expression values possible in the node.

Further preferably, computing the multiple condition coverage metric includes comparing a number of achieved true and false values for zero or more boolean sub-expressions in a compound node's constituent sub-flows to a total number of boolean sub-expression values possible in the compound node's constituent sub-flows.

Preferably, evaluating the attained coverage level includes assessing a number of values assumed by each of one or more fields in a message during the execution of the at least part of the test suite, comparing the number of values assumed to a total number of possible values for each field in the message, and computing a message content coverage metric responsive to the comparison.

Further preferably, the method includes computing a strong message content coverage metric wherein the total number of values possible for each field in the message includes a cross product of the message fields with their possible values.

Further preferably, the method includes computing a weak message content coverage metric wherein the total number of values possible for each field in the message includes a sum of the number of possible values for each message field independently.

Preferably, evaluating the attained coverage level includes traversing one or more paths during the execution of the at least part of the test suite, comparing a number of paths traversed to a total number of paths in the message flow, and computing a path coverage metric responsive to the comparison.

Preferably, evaluating the attained coverage level includes performing zero or more types of accesses to an external resource during the execution of the at least part of the test suite, comparing a number of types of accesses performed to a total number of types of accesses in the message flow, and computing a external resources coverage metric responsive to the comparison.

Preferably, designing the test suite responsive to the message-flow-coverage-goal includes identifying an initial test suite for the message flow, assessing a coverage level achieved by the initial test suite, and adding additional tests to the initial test suite so as to increase the coverage level.

Preferably, applying the test suite includes generating message-flow-coverage-reports.

Further preferably, the method includes integrating the message-flow-coverage-reports into a visual message flow development environment.

Preferably, the method includes reporting coverage graphically using at least one graphical element chosen from a set of color, shading, highlighting, graphing, fonts, line styles, icons, and labels.

Preferably, the method includes reporting coverage via at least one medium chosen from hard-copy media and electronic media.

Preferably, generating the coverage result includes collecting coverage data using at least one method of data collection chosen from message flow instrumentation and data logging.

There is further provided, according to a preferred embodiment of the present invention, apparatus for assessing adequacy of message flow testing, including a computer system which is adapted to define coverage criteria for testing a message flow through a set of message flow elements, determine a message-flow-coverage-goal for the message flow with respect to the coverage criteria, design a test suite responsive to the message-flow-coverage-goal, apply the test suite to the message flow to generate a coverage result for the set of message flow elements, and compare the coverage result with the message-flow-coverage-goal.

There is further provided, according to a preferred embodiment of the present invention, a computer software product for assessing adequacy of message flow testing, comprising a computer-readable medium having computer program instructions recorded therein, which instructions, when read by a computer, cause the computer to define coverage criteria for testing a message flow through a set of message flow elements, determine a message-flow-coverage-goal for the message flow with respect to the coverage criteria, design a test suite responsive to the message-flow-coverage-goal, apply the test suite to the message flow to generate a coverage result for the set of message flow elements, and compare the coverage result with the message-flow-coverage-goal.

The present invention will be more fully understood from the following detailed description of the preferred embodiments thereof, taken together with the drawings, in which:

BRIEF DESCRIPTION OF THE DRAWINGS

FIG. 6 is a textual condition coverage report for the sample message flow of FIG. 4, according to a preferred embodiment of the present invention;

DETAILED DESCRIPTION OF PREFERRED EMBODIMENTS

Figure 1:
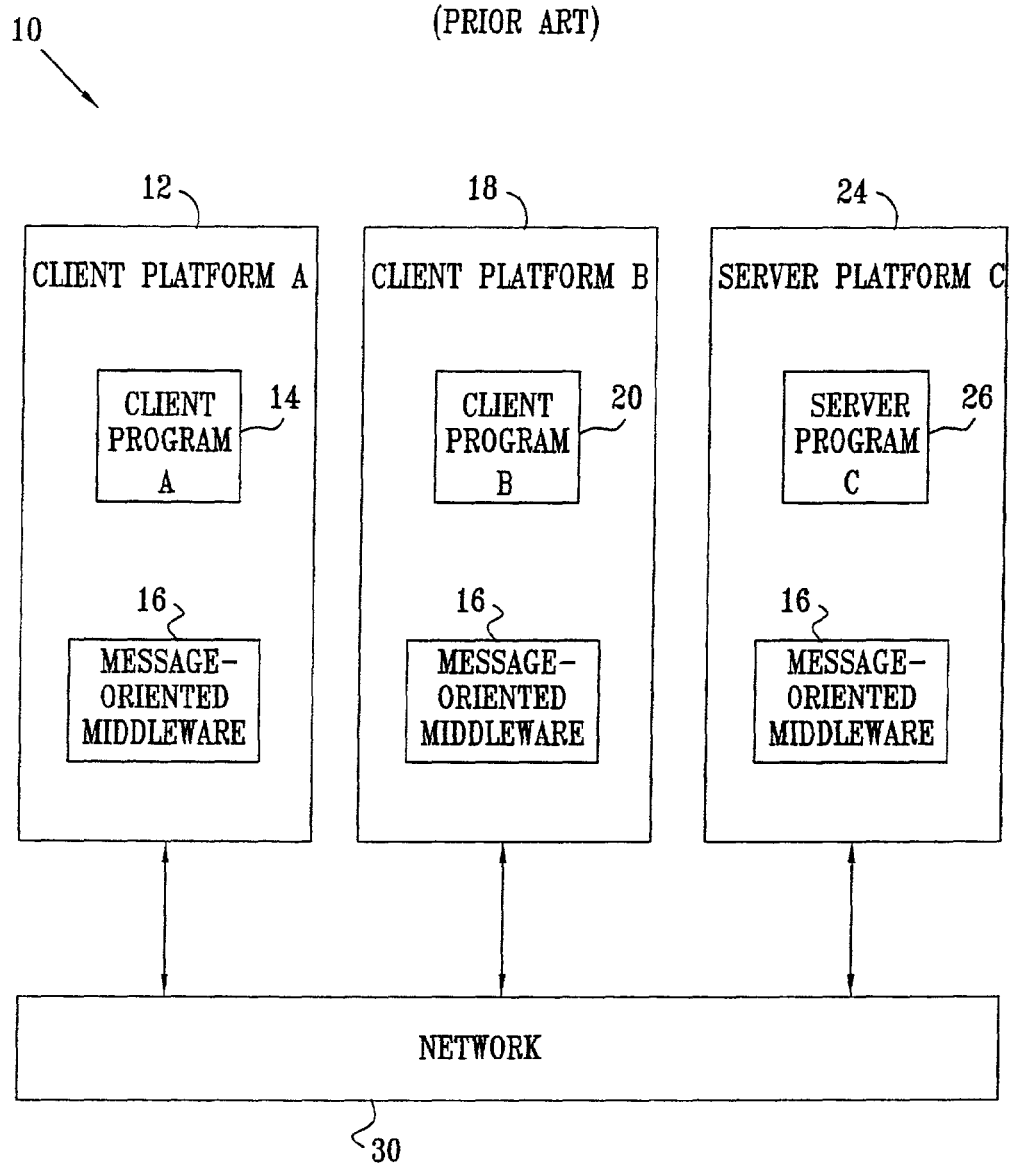
FIG. 1 is a schematic block diagram depicting an architecture of a system employing message-oriented middleware, as is known in the art.
Figure 2:
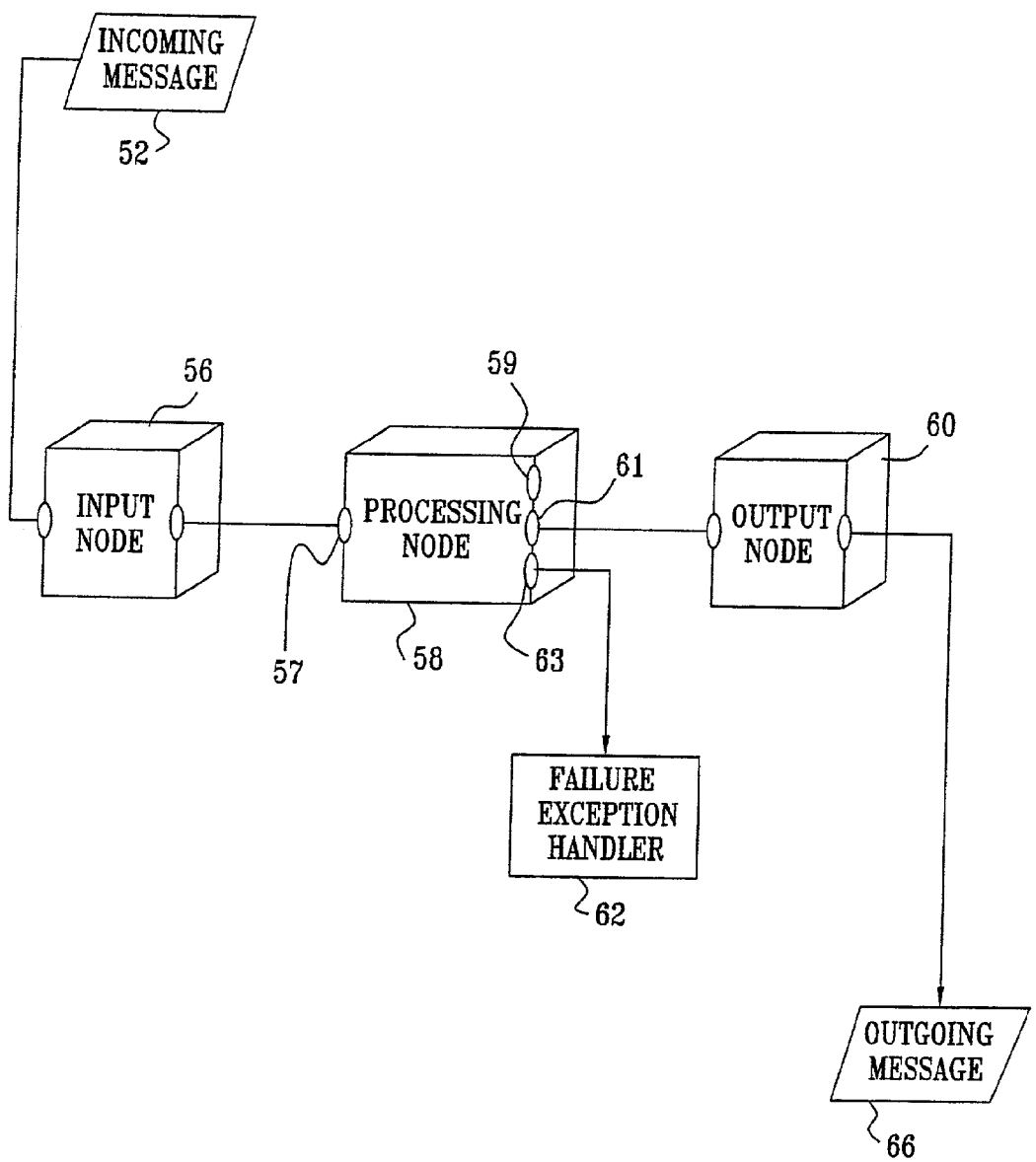
FIG. 2 is a schematic message flow directed graph illustrating a message flow, as is known in the art.
Figure 4:
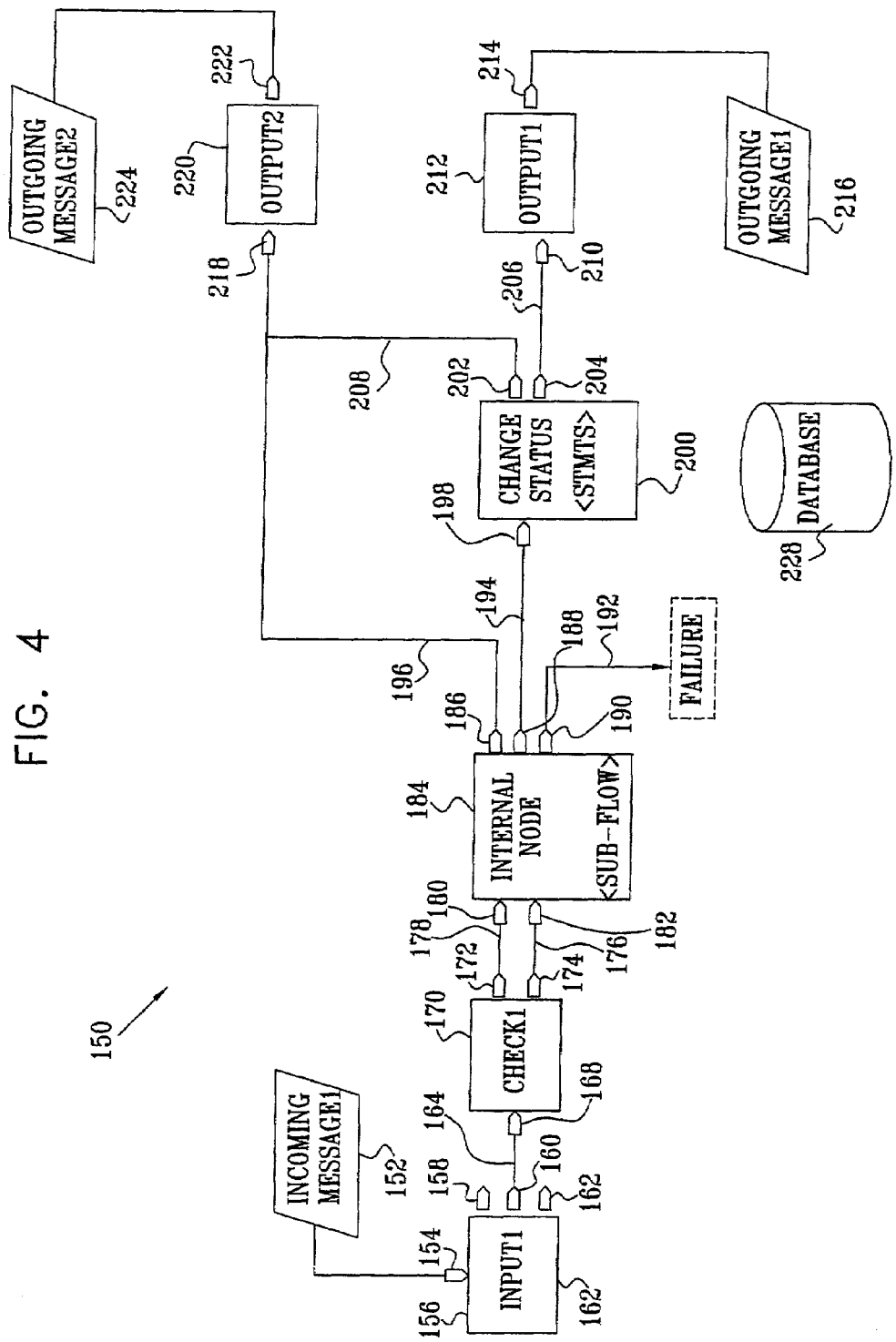
FIG. 4 is a schematic message flow directed graph showing elements in a sample message flow, according to a preferred embodiment of the present invention.

Reference is now made to FIG. 4, which is a schematic message flow directed graph showing elements in a sample message flow 150, according to a preferred embodiment of the present invention. Message flow 150 implements the handling of a message in the context of system 10 (FIG. 1). Message flow 150 is implemented by message-oriented middleware (MOM) 16, on client platform A, client platform B, or server platform C. As shown in FIG. 1 and described in the Background of the Invention, MOM 16 is a function separate from client program A, client program B, and server program C. Thus, client program B generates a message for client program A, which is handled by MOM 16, as an independent function, outside of message sender client program B or message receiver client program A. A message Incoming Message1 152 is sent, for example, to client platform A via network 30. Incoming Message1 152 enters message flow 150 through a terminal 154 of an input node Input1 156. Node Input1 156 comprises a message queue and message queue functions that are typically comprised in message-oriented middleware.

In the context of the present patent application and the claims, "message processing node," "processing node," and "node" are assumed to be equivalent terms referring to a set of actions performed on a message and constituting a well-defined stage of processing of a message, as is known in the art. A node may be supplied with a development environment with a pre-defined functionality, e.g., nodes Input1 156 and Check1 170. Alternatively, processing nodes may comprise user-coded statements defining special processing to perform on a message, e.g., a node InternalNode 184 and a node ChangeStatus 200. Further, message processing nodes themselves may comprise one or more message flows, e.g., node InternalNode 184. A message flow comprised within a node of a second message flow is called a "sub-flow," and a node comprising a sub-flow, such as InternalNode 184, is called a "compound" node. A node which does not comprise a sub-flow is called a "simple" node, such as a node Check1 170 and ChangeStatus 200. Message flow 150 comprises a plurality of messages, message processing nodes, and connections. The processing nodes in message flow 150, in turn, comprise the following additional message flow elements: terminals, statements, conditions, and exceptions. Table I below presents element types, a description of the element, and respective identifying numerals for each element comprised in message flow 150:

TABLE I

| | Element type | Description | Identifying Numeral |
|---|---|---|---|
| 1. | Message | Incoming | 152 |
| | | Outgoing | 216, 224 |
| 2. | Message Processing Node | Input | 156 |
| | | Output | 212, 220 |
| | | Other | 170, 184, 200 |
| 3. | Connection | | 164, 176, 178, 194, 196, 206, 208 |
| 4. | Exception | Failure, run-time error | 192 |
| 5. | Terminal | | 154, 158, 160, 162, 168, 172, 174, 180, 182, 186, 198, 190, 198, 202, 204, 210, 214, 218, 222 |
| 6. | Statement | Contained in nodes | 184 (within its sub-flow), 200 |
| 7. | Condition | Contained in nodes | 184 (within its sub-flow), 200 |
| 8. | External resource | Database | 228 |

Processing nodes comprise zero or more terminals. In the context of the present patent application and the claims, a terminal is defined as an access channel to a processing node, through which a message enters or exits a node.

Message processing node ChangeStatus 200 comprises code statements defining processing to perform on Incoming Message1 152. The code statements comprise conditional statements, evaluating to a true or false result based on user-coded comparisons between Incoming Message1 fields, internal constants, and variables. InternalNode 184 does not contain code statements of its own, but rather comprises a sub-flow, constructed of nodes comprising code statements.

Message flows commonly operate upon external resources, such as a database. Thus, although external resources are not, strictly speaking, elements of a message flow, nonetheless accesses to such resources merit coverage analysis. For example, processing node Check1 170 reads information from external resource database 228 in order to verify data. Therefore, in the context of the present patent application and the claims, external resources accessed by a message flow will be considered to belong to the set of message flow elements, together with messages, message processing nodes, connections, terminals, statements, conditions, and exceptions.

According to a preferred embodiment of the present invention, a system for evaluating message flow test adequacy comprises one or more of the criteria presented in Table II below, and described in detail subsequently:

TABLE II

| Criterion no. | Coverage criteria | Applicable to element type |
|---|---|---|
| 1. | Processing node coverage | Processing node |
| 2. | Processing node terminal coverage | Terminal |
| 3. | Connection coverage | Connection |
| 4. | Path coverage | Processing node |
| 5. | N-Node coverage | Processing node |
| 6. | Statement coverage | Processing node (comprising statements) |

TABLE II-continued

| Criterion no. | Coverage criteria | Applicable to element type |
|---|---|---|
| 7. | Multiple condition coverage | Processing node (comprising statements) |
| 8. | Exception coverage | Exception |
| 9. | External resources coverage | External resource |
| 10. | Message content coverage | Message |

In a preferred embodiment of the present invention, coverage of message flow elements is indicated in a graphical and/or textual manner, including, but not limited to, using color, shading, highlighting, shapes, graphs, icons, and labels to differentiate completely-covered, partially-covered, and uncovered elements. Coverage is reported via hard-copy and/or electronic media. The system for evaluating message flow test adequacy, using criteria of Table II, is implemented on any computer system, most preferably an industry-standard computer system, by reading instructions from a computer-readable medium such as a volatile or involatile memory.

In the following description of the coverage criteria presented in Table II, reference is made to coverage goals, coverage tasks, and a test suite. A description of these elements is provided with reference to FIG. 3 in the Background of the Invention.

Processing node coverage measures whether each processing node in message flow 150 is executed during a full or partial execution of the test suite. The set of coverage tasks is a list of all the processing nodes in message flow 150. Thus, 100% processing node coverage signifies that all nodes 156, 170, 184, 200, 212, 220 were executed. For a simple node, such as Check1 170, entering the node comprises executing it. Execution of a compound node, e.g., InternalNode 184, preferably comprises either partial or full execution, calculated according to a percentage of nodes in the sub-flow contained within the compound node InternalNode 184 that were executed.

A refinement of processing node coverage reports whether each terminal of a processing node is traversed during a full or partial execution of the test suite. The set of coverage tasks is a list of all the terminals in message flow 150. In this case, 100% processing node terminal coverage signifies that all input and output terminals of nodes 156, 170, 184, 200, 212, 220 were traversed. The list of all terminals in message flow 150 is given in Table I above. Measuring processing node terminal coverage for a compound node such as InternalNode 184 comprises evaluating a level of terminal coverage for its constituent sub-flows, not shown in Table I above.

Connection coverage measures a percentage of connections in message flow 150 which are traversed during a full or partial execution of the test suite. The set of coverage tasks is a list of all the connections in message flow 150. Complete connection coverage comprises traversing all connections 164, 176, 178, 194, 196, 206, 208. Measuring connection coverage for a compound node, such as InternalNode 184, comprises measuring a level of connection coverage for its constituent sub-flows.

Path coverage analyzes whether each of the possible paths through the message flow have been traversed. A path is defined as a unique sequence of processing nodes starting at an initial input node at the beginning of a message flow and ending either at a final output node of a message flow, or at a terminal without an outgoing connection (a dead end). The set of coverage tasks is the list of all possible paths through message flow 150, which begin at Input1 156, and terminate at either Output1 212, Output2 220, or at one of the dead ends, e.g., terminal 162.

N-node coverage evaluates whether a set of N nodes, selected by the user, is visited in a single execution of message flow 150. N is any whole number less than or equal to a total number of nodes in the message flow. Each selection of N nodes represents a partial or complete path through message flow 150. The set of coverage tasks is a group of selections of N-node sets. Complete N-node coverage comprises processing node coverage for all of the N-node selections in the group.

Statement coverage calculates a percentage of statements executed in processing nodes containing code, during a full or partial execution of the test suite. The set of coverage tasks is a list of code statements for each processing node in message flow 150. For a compound node or an entire message flow, node statement coverage expresses a level of coverage for all constituent nodes. Table III below presents an example of statements contained in processing node ChangeStatus 200:

TABLE III

| Statement no. | Statements |
|---|---|
| 1. | SET OutputRoot = InputRoot; |
| 2. | SET OutputRoot.XML.e_Human.e_Emp.e_Family . . . |
| 3. | CASE InputRoot.XML.e_Human.e_Emp.e_Name |
| 4. | WHEN 'Yaron' THEN 'Aizenbud' |
| 5. | WHEN 'Gabi' THEN 'Zodik' |
| 6. | END; |
| 7. | IF InputRoot.XML.e_Human.e_Occupation = 'CEO' OR InputRoot.XML.e_Human.e_Occupation = 'CTO' |
| 8. | SET OutputRoot.XML.e_Human.e Emp.e Status . . . |

A test suite may execute only some of the code statements in ChangeStatus 200. For example, if statements 1, 2, 3, 4, 6, and 7 are executed during the test suite, 75% statement coverage is achieved for ChangeStatus 200. A similar calculation may be made for all processing nodes containing code, in order to produce a node statement coverage measurement for message flow 150.

Multiple condition coverage reports for every processing node that contains a boolean sub-expression, the true or false outcome of each sub-expression, separated by logical AND and logical OR if they occur, in message flow 150, during a full or partial execution of the test suite. Mulitiple condition coverage measures the sub-expressions independently of each other. The set of coverage tasks is a list of all boolean sub-expression of a processing node containing a boolean expression. Referring to Table III above, multiple condition coverage for ChangeStatus 200 evaluates that each of the two sub-expressions "InputRoot.XML.e_Human.e_Occupation='CEO'" and "InputRoot.XML.e_Human.e_Occupation='CTO'" assumed both true and false values over execution of a test suite. If, for example, "InputRoot.XML.e_Human.e_Occupation='CEO'" evaluated to both true and false, and "InputRoot.XML.e_Human.e_Occupation='CTO'" evaluated only to false over an execution of the test suite, condition coverage for ChangeStatus 200 would be 50%. Exception coverage measures whether run-time exceptions occur in processing nodes having a capability of raising a run-time exception. Typically, run-time exceptions are implemented by way of failure terminals. The set of coverage tasks comprises all processing nodes having a failure terminal in message flow 150. Thus, 100% exception coverage for message flow 150 comprises covering node InternalNode 184 and terminal 190, i.e., covering exception 192.

External resources coverage checks whether each access to an external resource was exercised. Accesses to an external resource may be classified in various ways, for example, read, write, update, create, delete. The set of coverage tasks comprises a list of all external resources paired with each class of possible access. In message flow 150, for example, node Check1 170 reads from database 228 and node ChangeStatus 200 reads and updates database 228. 100% external resource coverage comprises exercising both read and update access to database 228.

Message content coverage reports whether a message field contained every possible value from a range of possible values for the field, during a full or partial execution of the best suite. A strong message content coverage criterion defines the set of coverage tasks as a cross product of message fields with their possible values. A weak message content coverage criterion determines if each message field assumed all possible values, considered independently of other message fields. For example, message Incoming Message1 152 comprises fields ID and PRIORITY. Assuming ID has allowable values {1, 2, 3} and PRIORITY has allowable values {A, B, C}, Table IV below presents the set of message content coverage tasks for the strong message content coverage criterion for message 152. Complete message content coverage, according to a strong criterion, means that the fields in message 152 assumed every combination of values shown in Table IV, during a full or partial execution of the test suite. A weak message content coverage criterion would require only that ID assumed each of the three possible values and, independently, that PRIORITY assumed each of the three possible values, at some time during a full or partial execution of the test suite.

TABLE IV

| ID | PRIORITY |
|---|---|
| 1 | A |
| 2 | A |
| 3 | A |
| 1 | B |
| 2 | B |
| 3 | B |
| 1 | C |
| 2 | C |
| 3 | C |

After creating message flow 150, the message flow developer typically performs testing on the message flow, to determine that all elements perform as expected, and that the overall message flow accomplishes its goals in a reliable manner. As with other types of software, the message flow developer performs the testing process substantially as described with reference to FIG. 3 above. During the testing process, coverage data is collected via message flow instrumentation, data logging, and/or other methods known in the art Referring to FIG. 3, in determine coverage model step 82, the message flow developer selects one or more coverage models from a plurality of coverage models used for message flows. The plurality comprises the coverage criteria presented in Table II above. For example, the message flow developer selects processing node coverage, connection coverage, and message content coverage for testing message flow 150. In establish coverage goals step 84, the developer determines coverage goals responsive to the coverage models selected in 82. Thus, coverage goals for message flow 150 might be 100% processing node coverage, 100% connection coverage, and 50% message content coverage. Factors influencing determination of coverage models and coverage goals typically comprise time and cost constraints, risk analysis, fault tolerance, and availability of testing tools.

Coverage tasks are defined in step 86, corresponding to the coverage models and coverage goals determined in steps 82 and 84. For message flow 150, for example, coverage tasks for the processing node coverage goal comprise executing processing nodes 156, 170, 184, all processing nodes in the sub-flow comprised in 184, 200, 212, and 220 in the message flow. Similar coverage tasks are defined for the connection coverage and message content coverage goals. A set of tests is generated in build test suite 88, with the aim of achieving all of the coverage tasks defined in step 86.

Testing process 80 as applied to message flow 150 continues substantially as described above with reference to FIG. 3, to measure coverage step 96. The coverage measured is the specific message flow coverage that was defined in steps 82, 84, and 86. The measured coverage is used as a criterion for halting testing in condition 104, and as a guide to the creation of additional tests in add tests to test suite step 108. For example, if coverage measurements revealed that a test suite executed all processing nodes except node Output2 220, an additional test could be added to the test suite in step 108, designed expressly to cover Output2 220.

Unlike other methods known in the art for evaluating test adequacy for message flows, in preferred embodiments of the present invention, definition of coverage models, goals, and tasks, and display of coverage information is performed in a visual environment. Information is reported graphically and textually. Preferably, the visual environment is integrated into the message flow development environment, so that the message flow developer utilizes familiar concepts and views to evaluate test adequacy for message flows. Further preferably, the visual environment for message flow coverage provides a user interface allowing the message flow developer to specify types and formats of message flow coverage information to report.

Figure 3:
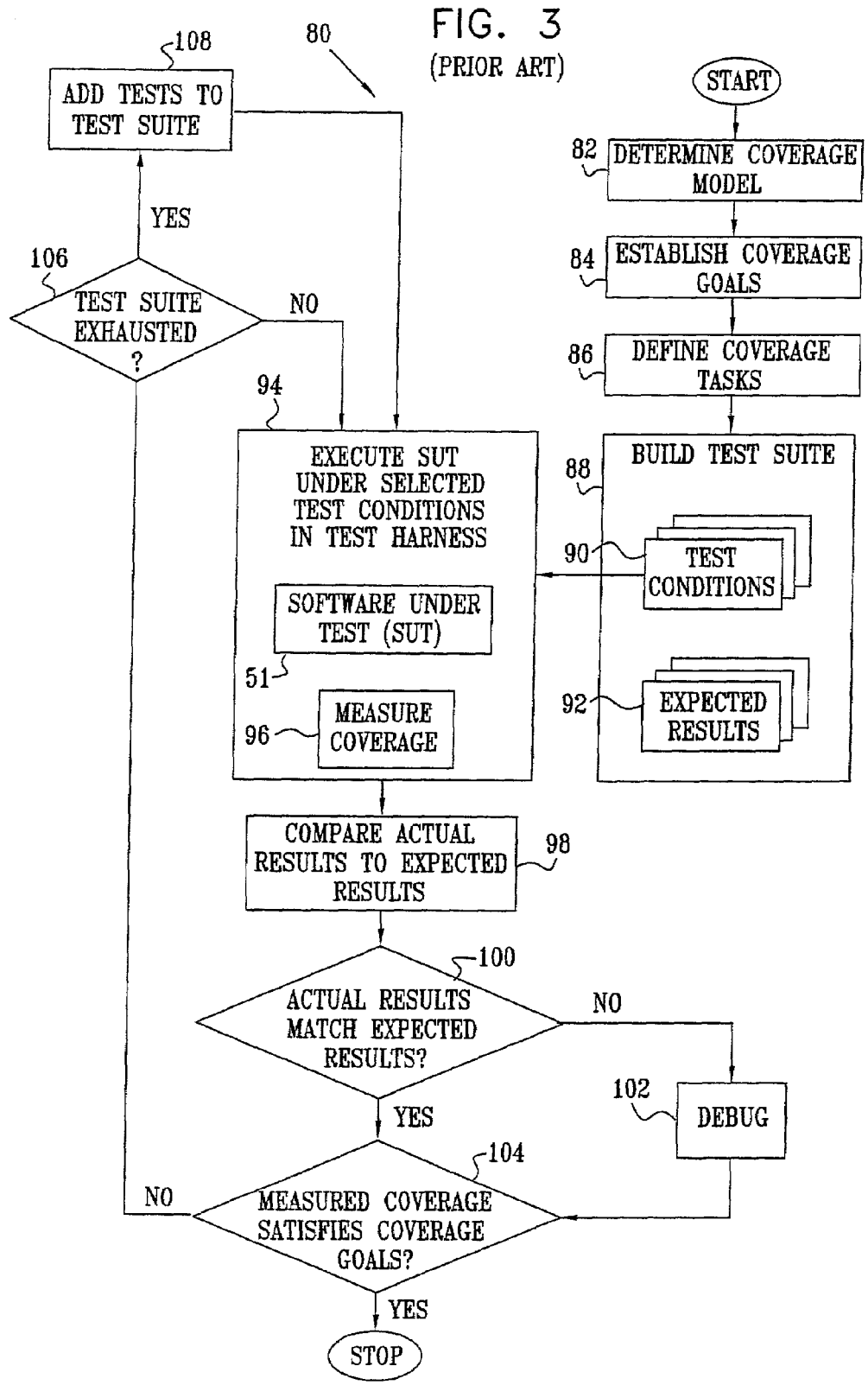
FIG. 3 is a flowchart of elements and processes involved in a process for testing software under test (SUT), as is known in the art.

Reference is now made to FIGS. 5 through 8, which are graphical and textual message flow coverage reports, according to a preferred embodiment of the present invention. Graphical and textual message flow coverage reports present coverage information for message flow 150, according to the coverage models selected in determine coverage model 82 (FIG. 3), and measured in measure coverage 96 (FIG. 3) over a test suite formulated in build test suite 88 and add tests to test suite 108 (FIG. 3). Graphical and textual message flow coverage reports may be produced on hardcopy or presented on electronic media, most preferably through a system integrated into a message flow development environment running on an industry-standard computer system. It is appreciated that coverage measurements may be indicated in the graphical and textual message flow coverage reports by a plurality of methods, including, but not limited to, shading, patterns, colors, labels, icons, graphs, shapes, font styles, and line styles. Additional reports and methods for displaying coverage information will be apparent to those skilled in the art.

Figure 5:
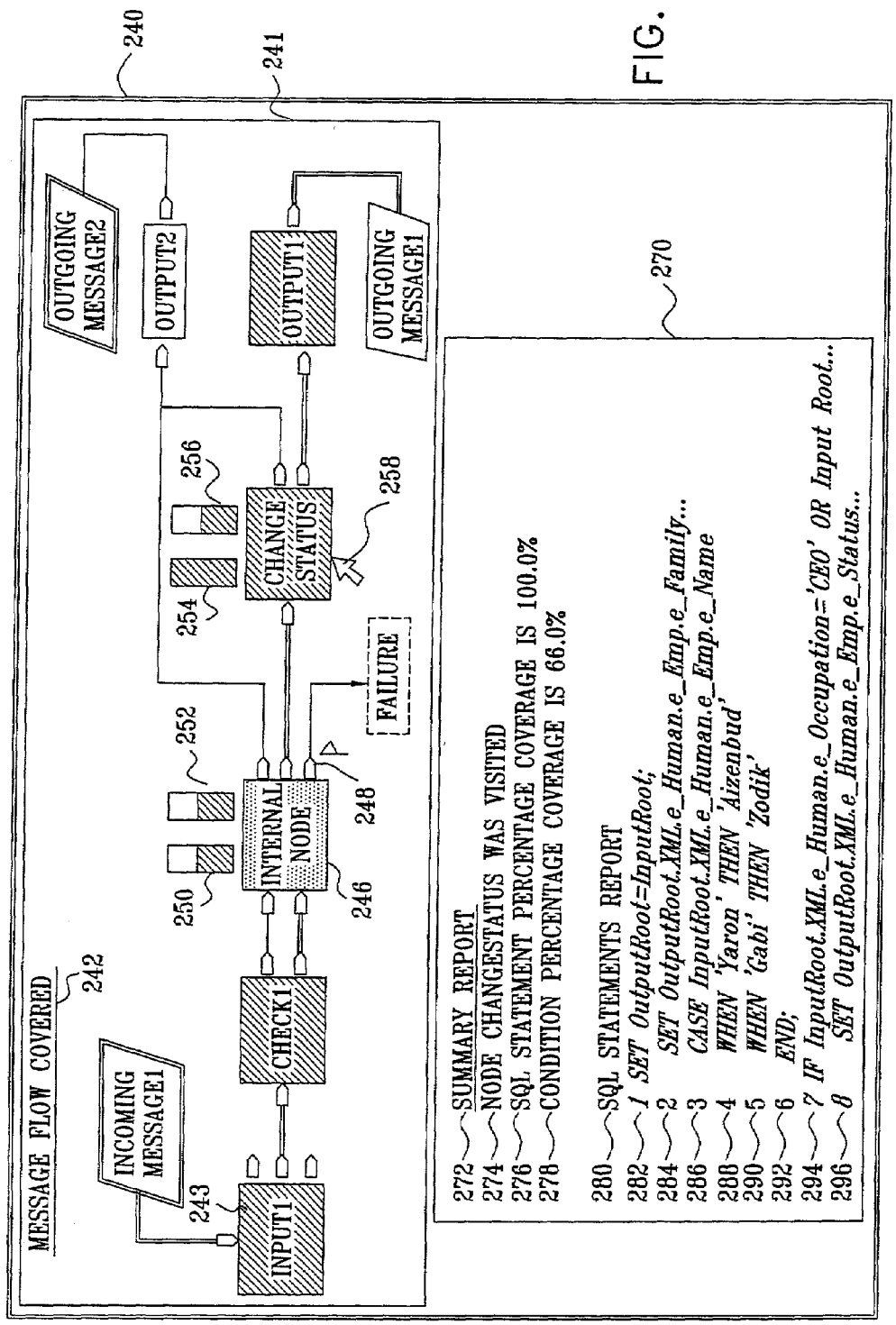
FIG. 5 is a graphical and textual message flow coverage report for the sample message flow of FIG. 4, according to a preferred embodiment of the present invention.

Reference is now made to FIG. 5, which is a graphical and textual message flow coverage report for the sample message flow of FIG. 4. Message flow coverage report 240 comprises a graphical display panel 241 and a textual display panel 270. In graphical display panel 241, message flow 150 (FIG. 4) is displayed together with annotations indicating message flow coverage measurements for coverage models selected by the user in determine coverage model 82 (FIG. 3), for a set of tests executed from test suite 88 (FIG. 3).

Processing node coverage is indicated by a shading pattern inside the shape representing the nodes, e.g., node Input1 156 contains a cross-hatch pattern 243, indicating 100% node coverage of Input1. Thus, nodes Input1 156, Check1 170, ChangeStatus 200, and Output1 212 achieved 100% node coverage. Node InternalNode 184 contains a dotted pattern 246, indicating only partial node coverage. Node Output2 220 contains no shading pattern, indicating a 0% coverage.

Graphical display panel 241 displays annotations of the connections comprised in message flow 150, so as to indicate a level of connection coverage. Connections 164, 176, 194, and 206 are displayed as double lines, signifying coverage of these connections. Connections 178, 196, and 208 are displayed as single lines, indicating that these connections were not traversed.

Exception coverage for message flow 150 comprises coverage of node InternalNode 184 and terminal 190. In graphical display panel 241, terminal 190 is designated by a small flag icon 248. Flag icon 248 is white, indicating that the exception was not covered. Coloring flag icon 248 black would indicate coverage of the exception.

Indications of statement coverage and multiple condition coverage are displayed in graphical display panel 241 in the form of small bar graphs. Statement coverage applies to processing nodes containing code statements, i.e., nodes comprised in the sub-flow of InternalNode 184 and ChangeStatus 200. Bar graphs 250 and 254 display statement coverage levels for nodes InternalNode and ChangeStatus respectively. In the case of bar graph 254, 100% statement coverage is indicated by complete shading of bar graph 254. In the case of bar graph 250, partial statement coverage, approximately 66%, is indicated by a partial shading of bar graph 250. Since InternalNode 184 is a compound processing node, i.e., it contains a sub-flow, bar graph 250 reflects an aggregation of coverage measurements for all component nodes.

Multiple condition coverage is presented in graphical display panel 241 in substantially the same way as statement coverage. Bar graphs 252 and 256 designate the level of condition coverage for nodes comprised in the sub-flow of InternalNode 184 and ChangeStatus 200 respectively. Both bar graph 252 and bar graph 256 indicate a partial condition coverage of approximately 66%. It is noted that, although node ChangeStatus 200 achieved 100% statement coverage, only partial condition coverage is achieved, a situation resulting from independent evaluation of boolean sub-expressions.

Textual display panel 270 presents coverage information in a textual format for a selected message processing node. In graphical display panel 241, the user selected node ChangeStatus 200, as indicated by an arrow 258 pointing to the node. Thus, textual display panel 270 displays information for node ChangeStatus. Report lines 274, 276, and 278 summarize respectively node coverage, statement coverage, and multiple condition coverage data for ChangeStatus. Report lines 282, 284, 286, 288, 290, 292, 294, and 296 present the SQL statements comprised in node ChangeStatus, with italics used to indicate covered statements. Preferably, the user can select nodes interactively via a user-friendly graphic user interface, and view summary information for each node selected.

Reference is now made to FIG. 6, which is a textual condition coverage report for the sample message flow of FIG. 4. A textual multiple condition coverage report panel 300 comprises a title 302 and report lines 304, 306, 308, 310, 312, and 314. Title 302 indicates that the information displayed applies to node ChangeStatus 200. Report line 304 presents the headings of the data displayed in the subsequent report lines. The data displayed comprises the following elements: the condition itself, e.g., "InputRoot.XML.e_Human.e_Occupation='CEO'" in the case of report line 306; the line number in the SQL code which contains the condition, e.g., 8 in the case of report line 306; the complete SQL statement containing the condition; the number of times the condition evaluated to false over the test suite for which the measurements were performed; and the number of times the condition evaluated to true over the test suite for which the measurements were performed. Textual multiple condition coverage report panel 300 comprises a report line for each sub-expression in each condition in the the node.

Figure 7:
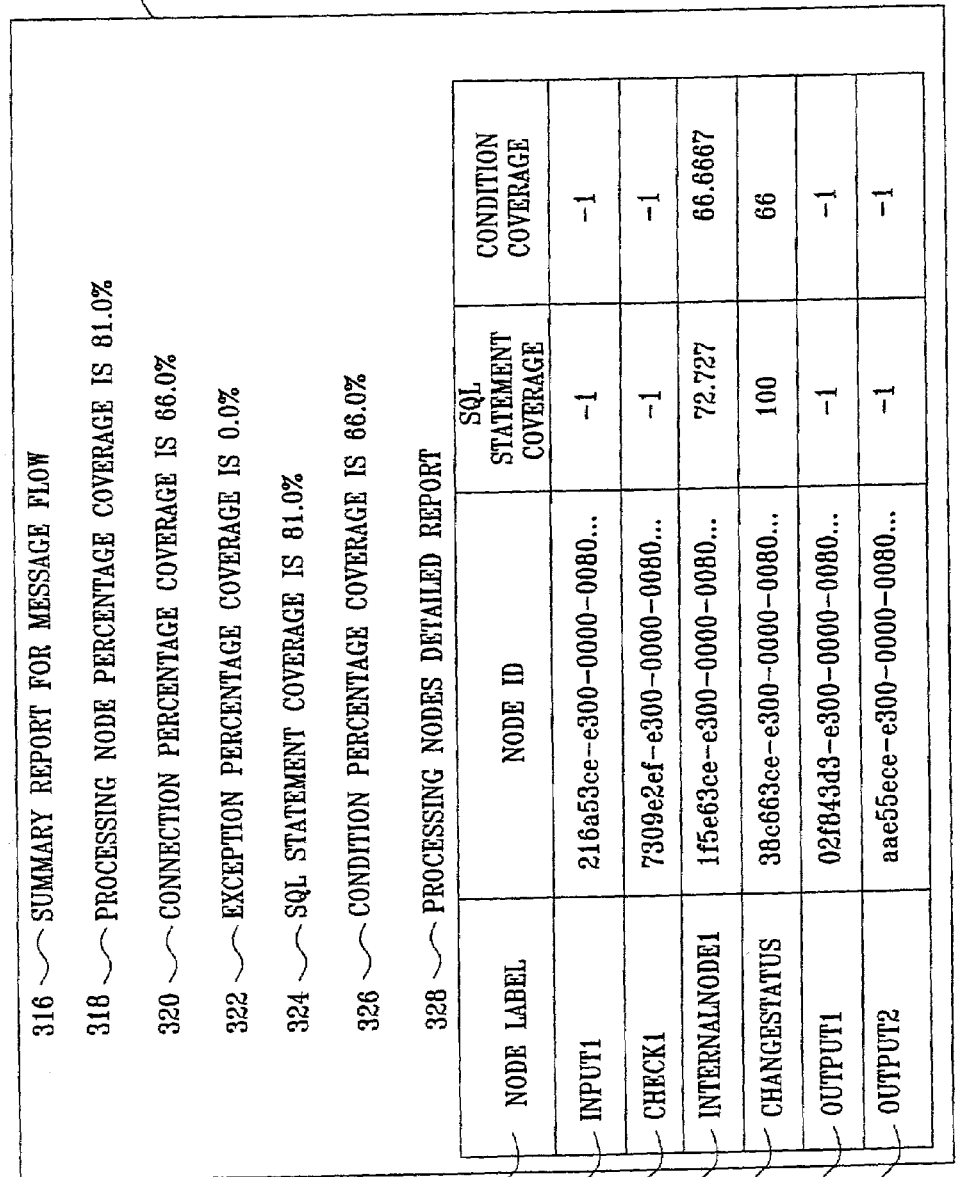
FIG. 7 is a textual summary coverage report for the sample message flow of FIG. 4, according to a preferred embodiment of the present invention.

Reference is now made to FIG. 7, which is a textual summary coverage report for the sample message flow of FIG. 4. A textual summary coverage report panel 315 comprises a summary line section 316 and a processing nodes detailed report section 328. Summary line section 316 comprises summary report lines 318, 320, 322, 324, and 326. Thus, over a full or partial execution of the test suite prior to producing summary coverage report panel 315, message flow 150 achieved the following coverage: 81% node coverage, 66% connection coverage, 0% exception coverage, 81% statement coverage, and 66% condition coverage. Processing nodes detailed report section 328 supplies detailed information for each node, comprising the node lablel, a unique identifier for the node, and details about statement and condition coverage measurements. For example, coverage for node ChangeStatus is given in detail line 338. Statement and multiple condition coverage are not applicable to nodes which have no SQL code statements. Therefore, statement coverage and condition coverage are indicated as −1, as in detail line 332 for node Input1.

Figure 8:
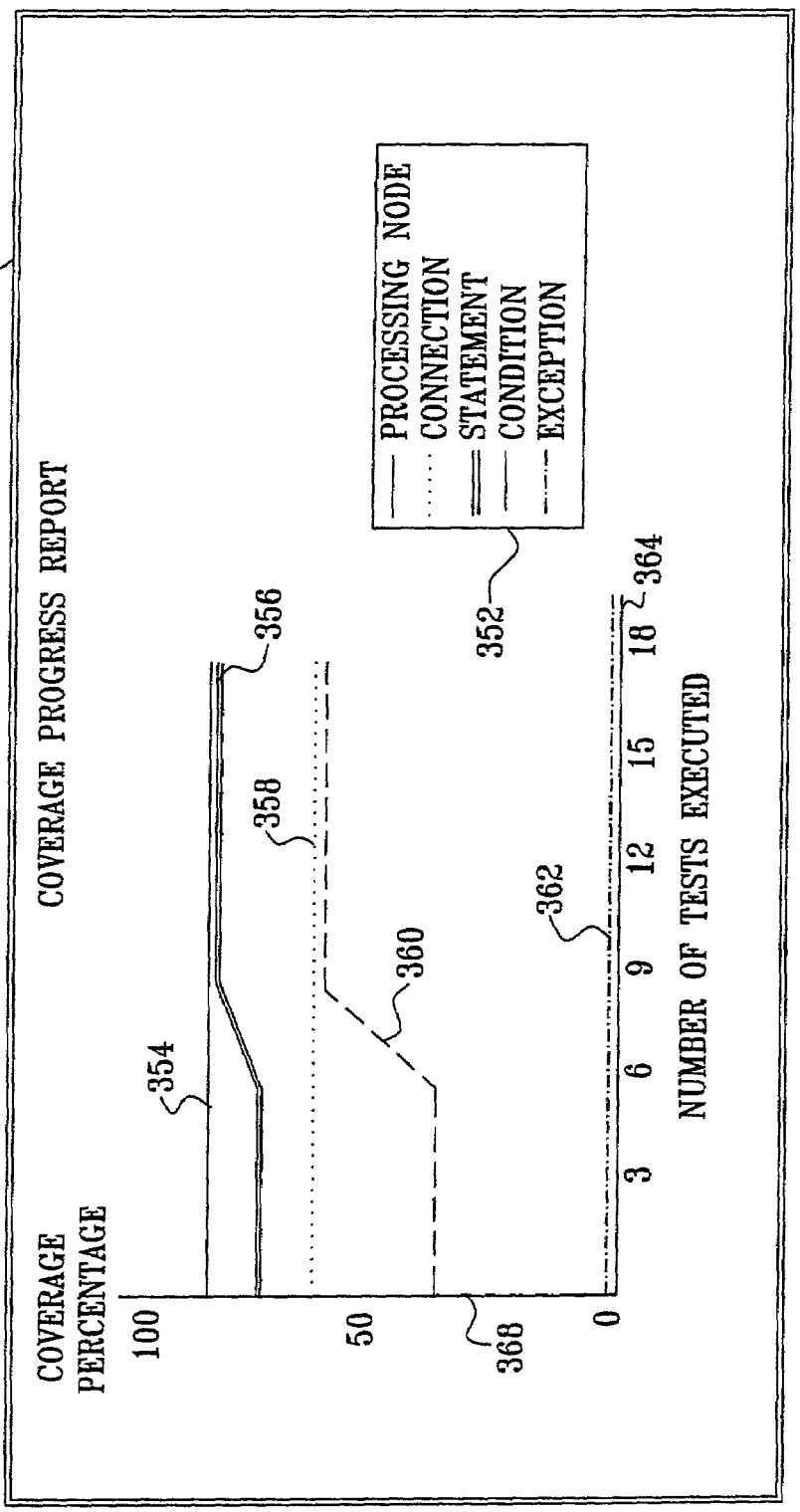
FIG. 8 is a graphical message flow coverage progress report for the sample message flow of FIG. 4, according to a preferred embodiment of the present invention.

Reference is now made to FIG. 8, which is a graphical message flow coverage progress report for the sample message flow of FIG. 4, according to a preferred embodiment of the present invention. A coverage progress report panel 350 comprises a legend 352 and graphs 354, 356, 358, 360, and 362. Legend 352 provides a key to distinguish among the different graphs presented. In preferred embodiments of the present invention, the graphs are distinguished using line styles, colors, thicknesses, and other means known in the art for the differentiation of lines. Legend 352 associates a type of coverage with a graph line. Graphs 354, 356, 360, and 362 plot a coverage percentage over a number of tests executed. The number of tests executed refers to the testing process illustrated in FIG. 3, wherein test execution step 94 is repeated for each test in test suite 88. The coverage percentage is the coverage measured in measure coverage 96, for each of the coverage models selected in determine coverage model 82. Coverage progress report panel 350 presents the behavior of coverage measurements as additional tests are executed. It may be seen, for example, that no additional coverage benefit was derived from executing more tests after the ninth test.

It will be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for assessing adequacy of a message-flow test suite for testing a message flow through a set of message flow elements, the method comprising:
   defining coverage criteria providing numerical evaluations of an extent to which the message-flow test suite covers a predefined property, wherein defining the coverage criteria comprises selecting a coverage model from at least one of processing node coverage, terminal coverage, connection coverage, path coverage, one or more nodes coverage, statement coverage, multiple condition coverage, exception coverage, external resources coverage, and message content coverage;
   determining a numerical message-flow-coverage-goal for the message flow with respect to the coverage criteria;
   applying the message-flow test suite to the message flow, while evaluating the coverage criteria so as to generate a numerical coverage result for the set of message flow elements; and
   comparing the numerical coverage result with the numerical message-flow-coverage-goal, so as to evaluate the adequacy of the message-flow test suite.

2. A method according to claim 1, wherein the message flow comprises a message-oriented software program wherein a message is a primary architectural element.

3. A method according to claim 1, wherein the message flow is comprised in a message-oriented middleware application.

4. A method according to claim 1, wherein the message flow comprises a visual program describing processing logic as a directed graph and wherein the message flow comprises an independent function, outside of a message sender or message receiver.

5. A method according to claim 1, wherein the message flow comprises a program processing a message produced by an application chosen from one of a group of applications comprising a client application and a server application.

6. A method according to claim 5, wherein the application comprises a message-sending-application and a message-receiving-application executing on different hardware platforms.

7. A method according to claim 6, wherein the message-sending-application and the message-receiving-application are implemented using different software and architectural paradigms.

8. A method according to claim 1, wherein the message flow elements comprise at least one element chosen from messages, nodes, connections, terminals, statements, conditions, external resources, and exceptions.

9. A method according to claim 1, wherein determining the numerical message-flow-coverage-goal comprises establishing a required coverage level for at least one of the coverage criteria.

10. A method according to claim 1, wherein applying the message-flow test suite to the message flow comprises:
    performing an execution of at least a part of the message-flow test suite; and
    evaluating an attained coverage level resulting from the execution.

11. A method according to claim 10, wherein evaluating the attained coverage level comprises:
    visiting one or more nodes during the execution of the at least part of the message-flow test suite;
    comparing a number of processing nodes visited to a total number of all processing nodes in the message flow; and
    computing a processing node coverage metric responsive to the comparison.

12. A method according to claim 11, wherein visiting the one or more nodes comprises entering a simple node.

13. A method according to claim 11, wherein visiting the one or more nodes comprises entering a compound node and visiting zero or more nodes in a constituent sub-flow.

14. A method according to claim 10, wherein evaluating the attained coverage level comprises:
    traversing one or more terminals during the execution of the at least part of the message-flow test suite;
    comparing a number of processing node terminals traversed to a total number of processing node terminals in the message flow; and
    computing a terminal coverage metric responsive to the comparison.

15. A method according to claim 10, wherein evaluating the attained coverage level comprises:
    traversing one or more connections during the execution of the at least part of the message-flow test suite;
    comparing a number of connections traversed to a total number of connections in the message flow; and
    computing a connection coverage metric responsive to the comparison.

16. A method according to claim 10, wherein evaluating the attained coverage level comprises:
    selecting a group of one or more sets of N-nodes from the message flow, wherein N comprises any whole number less than or equal to a total number of nodes in the message flow;
    performing at least one execution of the message flow so as to determine a number of nodes visited in each of the one or more sets during the at least one execution;
    generating a respective set coverage result for each of the one or more sets, responsive to the number of nodes visited;
    determining a number of covered-sets, responsive to the set coverage results;
    comparing the number of covered-sets to a total number of sets in the group; and
    computing an N-node coverage metric responsive to the comparison.

17. A method according to claim 10, wherein evaluating the attained coverage level comprises:
    performing zero or more runtime exceptions during the execution of the at least part of the message-flow test suite;
    comparing a number of runtime exceptions performed to a total number of all runtime exceptions in the message flow; and
    computing an exception coverage metric responsive to the comparison.

18. A method according to claim 10, wherein evaluating the attained coverage level comprises:
    visiting zero or more failure terminals during the execution of the at least part of the message-flow test suite;
    comparing a number of failure terminals visited to a total number of all failure terminals in the message flow; and
    computing an exception coverage metric responsive to the comparison.

19. A method according to claim 10, wherein evaluating the attained coverage level comprises:
   executing zero or more node statements at least once during the execution of the at least part of the message-flow test suite;
   comparing a number of node statements executed to a total number of node statements in the message flow; and
   computing a statement coverage metric responsive to the comparison.

20. A method according to claim 19, wherein computing the statement coverage metric comprises comparing a number of node statements executed in a single node to a total number of node statements in the single node.

21. A method according to claim 19, wherein computing the statement coverage metric comprises comparing a number of node statements executed in a compound node's constituent sub-flows to a total number of node statements in the compound node's constituent sub-flows.

22. A method according to claim 10, wherein evaluating the attained coverage level comprises:
   assessing an achievement of true and false values for each of zero or more boolean sub-expressions independently during the execution of the at least part of the message-flow test suite;
   comparing the achievement for the one or more boolean sub-expressions to a total number of boolean sub-expression values possible in the message flow; and
   computing a multiple condition coverage metric responsive to the comparison.

23. A method according to claim 22, wherein computing the multiple condition coverage metric comprises comparing a number of achieved true and false values for zero or more boolean subexpressions in a node to a total number of boolean subexpression values possible in the node.

24. A method according to claim 22, wherein computing the multiple condition coverage metric comprises comparing a number of achieved true and false values for zero or more boolean sub-expressions in a compound node's constituent sub-flows to a total number of boolean sub-expression values possible in the compound node's constituent sub-flows.

25. A method according to claim 10, wherein evaluating the attained coverage level comprises:
   assessing a number of values assumed by each of one or more fields in a message during the execution of the at least part of the message-flow test suite;
   comparing the number of values assumed to a total number of possible values for each field in the message; and
   computing a message content coverage metric responsive to the comparison.

26. A method according to claim 25, and comprising computing a strong message content coverage metric wherein the total number of values possible for each field in the message comprises a cross product of the message fields with their possible values.

27. A method according to claim 25, and comprising computing a weak message content coverage metric wherein the total number of values possible for each field in the message comprises a sum of the number of possible values for each message field independently.

28. A method according to claim 10, wherein evaluating the attained coverage level comprises:
   traversing one or more paths during the execution of the at least part of the message-flow test suite;
   comparing a number of paths traversed to a total number of paths in the message flow; and
   computing a path coverage metric responsive to the comparison.

29. A method according to claim 10, wherein evaluating the attained coverage level comprises:
   performing zero or more types of accesses to an external resource during the execution of the at least part of the message-flow test suite;
   comparing a number of types of accesses performed to a total number of types of accesses in the message flow; and
   computing an external resources coverage metric responsive to the comparison.

30. A method according to claim 1, and comprising designing the message-flow test suite responsive to the message-flow-coverage-goal using the steps of:
   identifying an initial message-flow test suite for the message flow;
   assessing a coverage level achieved by the initial message-flow test suite; and
   adding additional tests to the initial message-flow test suite so as to increase the coverage level.

31. A method according to claim 1, wherein applying the message-flow test suite comprises generating message-flow-coverage-reports.

32. A method according to claim 28, and comprising integrating the message-flow-coverage-reports into a visual message flow development environment.

33. A method according to claim 1, and comprising reporting coverage graphically using at least one graphical element chosen from a set of color, shading, highlighting, graphing, fonts, line styles, icons, and labels.

34. A method according to claim 1, and comprising reporting coverage via at least one medium chosen from hard-copy media and electronic media.

35. A method according to claim 1, wherein generating the numerical coverage result comprises collecting coverage data using at least one method of data collection chosen from message flow instrumentation and data logging.

36. Apparatus for assessing adequacy of a message-flow test suite for testing a message flow through a set of message flow elements, the apparatus comprising a computer system which is adapted to define coverage criteria providing numerical evaluations of an extent to which the message-flow test suite covers a predefined property, wherein the defined coverage criteria comprises selecting a coverage model from at least one of processing node coverage, terminal coverage, connection coverage, path coverage, one or more nodes coverage, statement coverage, multiple condition coverage, exception coverage, external resources coverage, and message content coverage, determine a numerical message-flow-coverage-goal for the message flow with respect to the coverage criteria, apply the message-flow test suite to the message flow, while evaluating the coverage criteria so as to generate a numerical coverage result for the set of message flow elements, and compare the numerical coverage result with the numerical message-flow-coverage-goal, so as to evaluate the adequacy of the message-flow test suite.

37. A computer software product for assessing adequacy of a message-flow test suite for testing a message flow through a set of message flow elements, comprising a computer-storage medium having computer program instructions recorded therein, which instructions, when read by a computer, cause the computer to define coverage criteria providing numerical evaluations of an extent to which the message-flow test suite covers a predefined property, wherein the defined coverage criteria comprises selecting a coverage model from at least one of processing node coverage, terminal coverage, connection coverage, path coverage, one or more nodes coverage, statement coverage, multiple condition coverage, exception coverage, external resources coverage, and message content coverage, determine a numerical message-flow-coverage-goal for the message flow with respect to the coverage criteria, apply the message-flow test suite to the message flow, while evaluating the coverage criteria so as to generate a numerical coverage result for the set of message flow elements, and compare the numerical coverage result with the numerical message-flow-coverage-goal, so as to evaluate the adequacy of the message-flow test suite.

* * * * *